Patented Sept. 8, 1925.

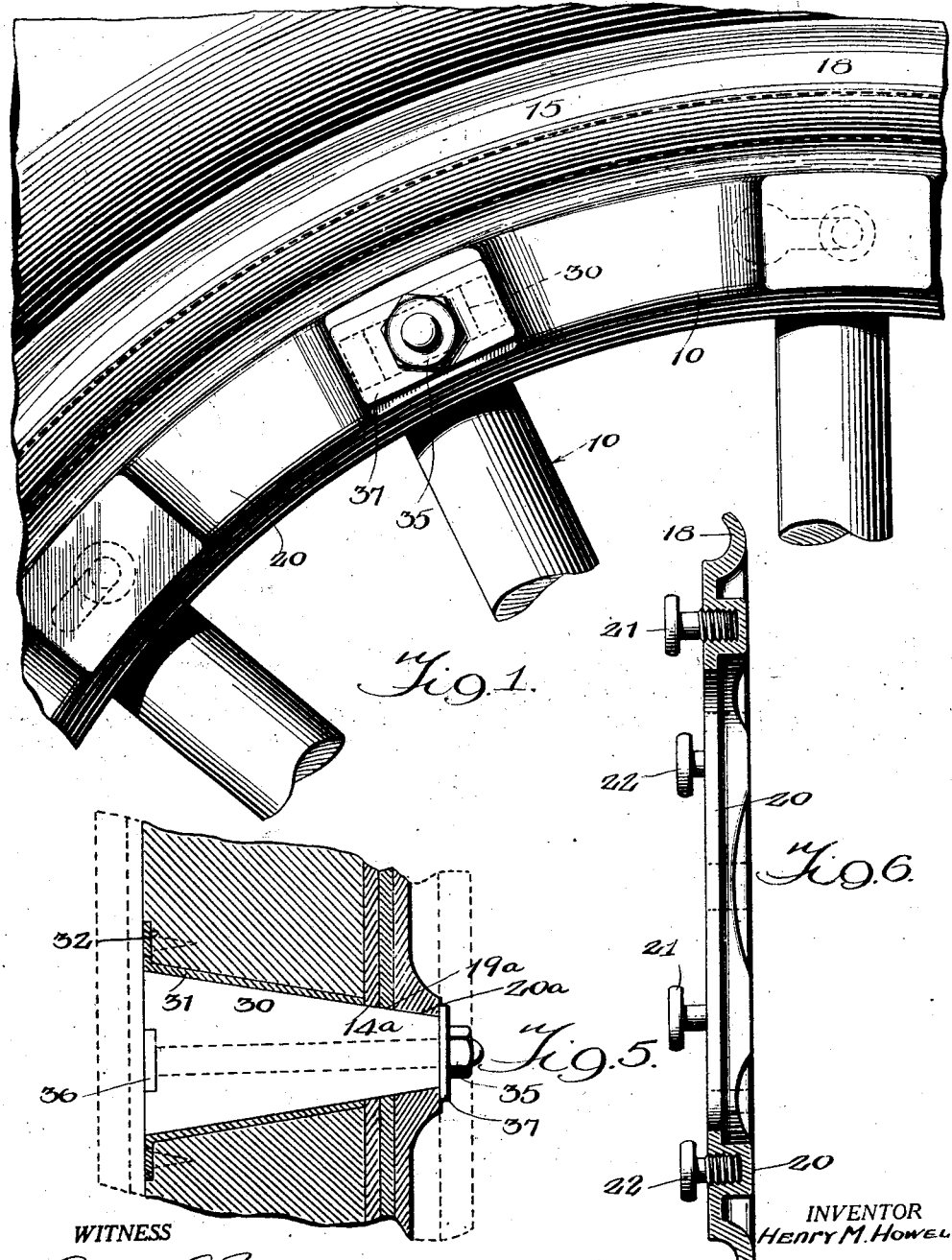

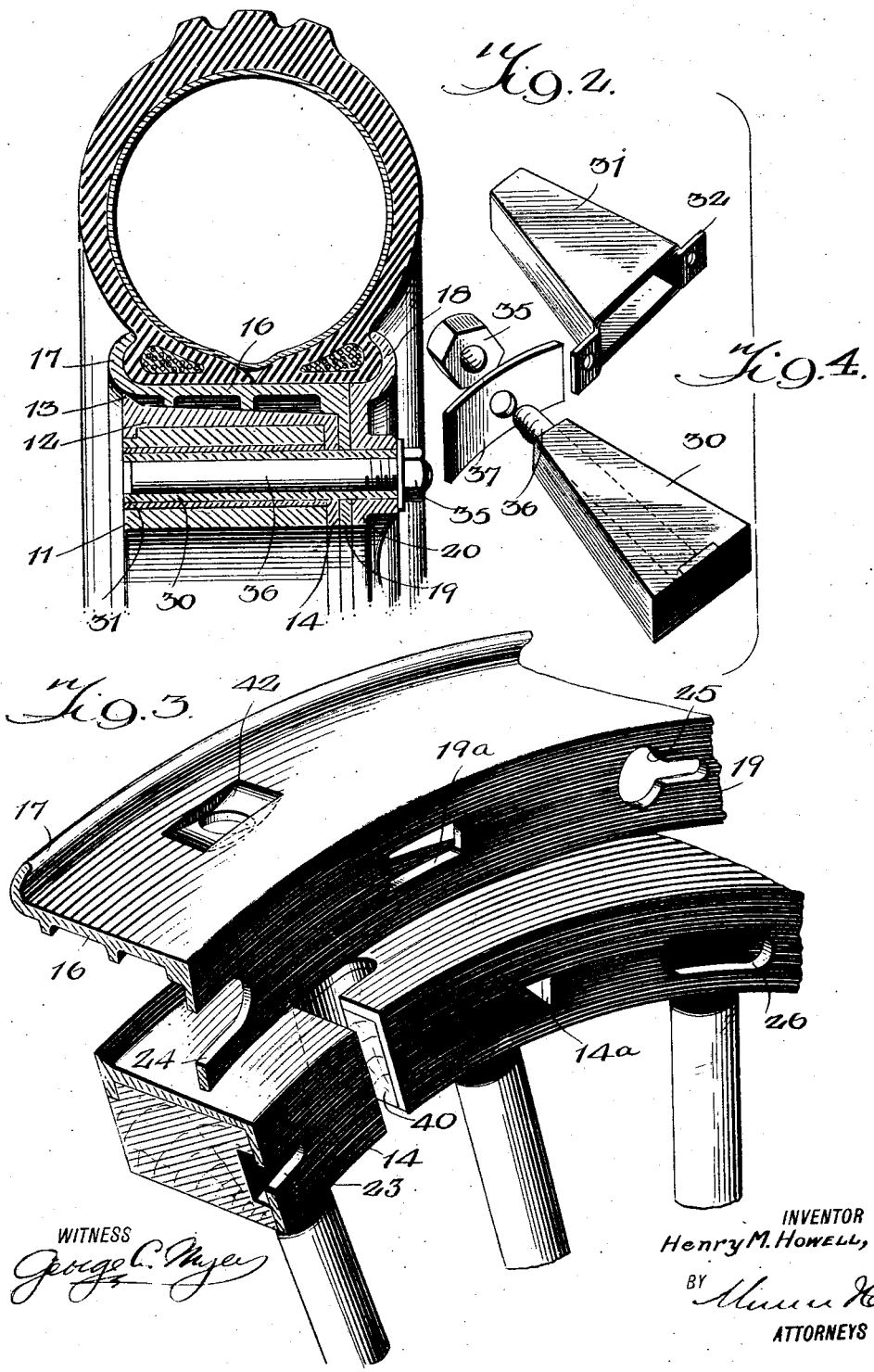

1,552,743

UNITED STATES PATENT OFFICE.

HENRY M. HOWELL, OF MONROE, LOUISIANA, ASSIGNOR OF ONE-HALF TO JOHN EDWARD DOUGHTIE, OF MONROE, LOUISIANA.

WHEEL.

Original application filed July 3, 1922. Serial No. 572,497. Divided and this application filed March 28, 1923. Serial No. 628,373.

*To all whom it may concern:*

Be it known that I, HENRY MARTIN HOWELL, a citizen of the United States, and a resident of Monroe, in the parish of Ouachita and State of Louisiana, have invented certain new and useful Improvements in Wheels, of which the following is a specification.

This invention relates to an improvement in wheels of the type embodying a demountable rim and is a division of my application for patent for wheels, filed July 3, 1922, Serial No. 572,497.

The object of the invention is to provide a wheel of this character wherein the demountable rim may be readily and easily taken from or placed upon the wheel by persons of ordinary skill or strength and without the necessity of the expenditure of tiresome and disagreeable effort or without the employment of special tools, the organization being at the same time of such a nature as to provide for a firm and rigid mounting of the rim in assembly and a secure and durable though readily releasable locking thereof.

A further object is to provide a device of this character and having the foregoing advantages and which is also of simple and durable construction, reliable and efficient in operation, attractive and ornamental in appearance and adapted to be manufactured at a comparatively slight expense from material and by means of facilities ordinarily available.

Other objects and advantages of the invention reside in certain novel features of the construction, combination and arrangement of parts which will be hereinafter more fully described and particularly pointed out in the appended claim, reference being had to the accompanying drawings forming part of this specification, and in which:

Figure 1 is a fragmentary view in elevation, showing a portion of the wheel equipped with a demountable rim embodying the present invention;

Figure 2 is a transverse section of the same;

Figure 3 is a fragmentary perspective view, showing the operating parts of the wheel structure and demountable rim structure;

Figure 4 is a group view in perspective, illustrating the locking bar and associated structure;

Figure 5 is a view, showing the locking bar in plan and in assembly, the wheel structure and demountable rim structure as well as the ferrule for the locking bar being broken away and shown in horizontal section; and Figure 6 is a detail view in section, illustrating the removable outer tire retaining flange and the locking studs carried thereby.

Referring to the drawings, the numeral 10 designates a wheel which may be of any conventional type. As shown in Figure 2 the wheel includes a felly 11 upon which a felly band or fixed rim 12 is shrunk or otherwise suitably secured, the felly band having a circumferential shoulder 13 constituting a seat or abutment for the demountable rim and having an integral locking plate 14 at its outer circumferential edge, the integral locking plate depending from the felly band and being disposed flush up against the outer lateral face of the felly 11. The felly 11 is slightly reduced in width so that the thickness of the locking plate complements the width or thickness of the felly to provide the complete felly of standard dimensions.

A demountable rim, designated generally at 15, is provided and includes a base section 16, the inner tire retaining flange 17 and an outer removable tire retaining flange 18. The base section 16 of the demountable rim is provided at its outer circumferential edge with an integral depending locking plate 19 adapted to lie flush up against the locking plate 14 in assembly and the outer retaining flange 18 also includes an integral locking plate 20 adapted to lie flush up against the locking plate 19 in the assembly. The locking plate 20 carries a plurality, preferably four long studs and a plurality, preferably four short studs, the studs being designated at 21 and 22, respectively, and being threaded, welded or otherwise suitably secured to the plate 20 and being provided with heads of suitable formation. The long studs 21 coact with key-hole slots 23 provided in the plate 14, the plate 19 being provided with slots 24 admitting of the passage of the studs 21 into the slots 23. The short studs 22 cooperate with key hole slots 25 provided in the locking plate 19, the heads of the studs being accommodated in slots 26 provided for such purpose in the locking plate 14. By this arrangement the outer retaining flange 18 may be securely locked to the other elements of the demountable rim and the demountable rim as a whole may be locked on the wheel, this locking action however being entirely complete and secure as against all except circumferential movement in one direction.

An important feature of the present invention resides in the provision of novel means for releasably though securely locking these parts against circumferential movement in either direction. This means is shown in assembly in Figures 2 and 5 and in detail in Figure 4, and comprises a tapered or wedge shaped or tapering locking bar 30 adapted to have its small end slipped into the large end of a correspondingly shaped ferrule 31 embedded in an opening formed therefor in the felly and secured in position by ears 32. The locking bar is snugly fitted in the ferrule in locking position and the small end thereof projects beyond the small end of the ferrule and is snugly fitted in openings 14ª, 19ª and 20ª provided therefor in the plates 14, 19 and 20, respectively. The locking bar thus presents a substantial metallic cross section as opposing circumferential movement of the parts hereinabove described and thus provides a firm, strong and durable lock which is not liable to become distorted or weakened by long continued use. At the same time the locking bar may be readily taken from locking position by merely releasing or unthreading the nut 35 which coacts with the bolt 36 and a plate 37 for preventing endwise displacement of the block toward the left as viewed in Figure 5, the nut being threaded on the bolt and engaging the plate 37 which spans the opening 20ª in the plate 20 and the head of the bolt 36 being embedded or countersunk in the bar 30 with the shank of the bolt extending axially through the bar, as shown in Figure 5.

The locking plate is preferably somewhat enlarged or made heavy around the opening 20ª as well as at points thereon to which the studs both long and short are connected. The felly 11, and its felly band 12 are each provided with an L-shaped slot to accommodate the valve stem in the usual manner, this L-shaped slot being designated at 40. The base section of the demountable rim is provided with an opening 42, through which the valve stem of the inner tube extends.

In this manner there is provided a demountable rim which entirely obviates the necessity of pinching the tire over the retaining flanges, the changing of the tires being thus greatly facilitated. Also a spare tire all ready pumped up and otherwise complete and ready for service may be conveniently placed on the wheel. While having these advantages the wheel and rim is at the same time of strong and durable construction, reliable in operation, attractive in appearance and easy and comparatively inexpensive to manufacture.

I claim:

In combination, a wheel including a felly having a transverse wedge-shaped opening therethrough and a fixed rim thereon, said rim having a depending locking plate having a transverse opening therethrough in register with the small end of the aforesaid felly opening, a demountable rim adapted to be mounted on said fixed rim, locking means for securing the demountable rim against all except circumferential movement, and means for holding the demountable rim against circumferential movement, said last named means including a wedge-shaped ferrule seated in the felly opening and secured to the felly, a wedge-shaped locking bar fitting and extending through said ferrule, and means for holding the locking bar against displacement and comprising a bolt having one end threaded and extended through the locking bar and its head seated in the large end of the locking bar, said threaded end projecting beyond the small end of the locking bar, and a plate and nut coacting with said threaded end of the bolt.

HENRY M. HOWELL.